(No Model.)

J. L. YULY & H. W. ANDREWS.
EXPANDING PULLEY.

No. 389,276. Patented Sept. 11, 1888.

Witnesses.
Thomas Ernest Halford.
Cecil Hammond.

Inventors.
J. L. Yuly.
H. W. Andrews.
per Alex. Browne, Atty.

N. PETERS, Photo-Lithographer, Washington, D. C.

UNITED STATES PATENT OFFICE.

JUDAH LEVY YULY AND HERBERT WALTER ANDREWS, OF SOUTHSEA, ENGLAND.

EXPANDING PULLEY.

SPECIFICATION forming part of Letters Patent No. 389,276, dated September 11, 1888.

Application filed September 6, 1887. Serial No. 248,980. (No model.)

*To all whom it may concern:*

Be it known that we, JUDAH LEVY YULY and HERBERT WALTER ANDREWS, subjects of the Queen of Great Britain, residing, respectively, at 53 Albert Road, Southsea, England, and 20 Troddington Road, Southsea, England, have invented Improvements in the Construction of Expanding Pulleys, of which the following is a specification.

Our invention has for its objects, first, to provide an expanding pulley the diameter of which can be increased or diminished to a greater extent than has been hitherto attainable; and, second, to diminish the wear and tear of the belt driven by the said pulley by covering the rim of the pulley with some elastic material, so as to bridge over the gaps between the segments forming the rim of the pulley when expanded. We attain these objects by the mechanism illustrated in the accompanying drawings, in which—

Figure 1:
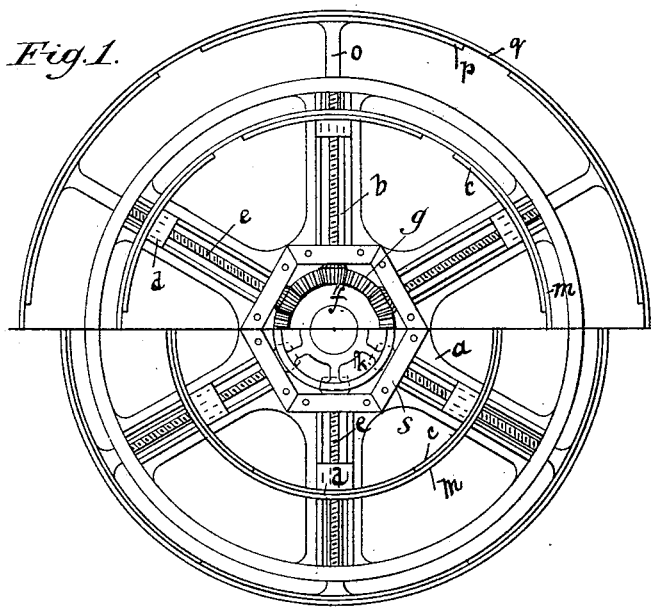
Figure 3:
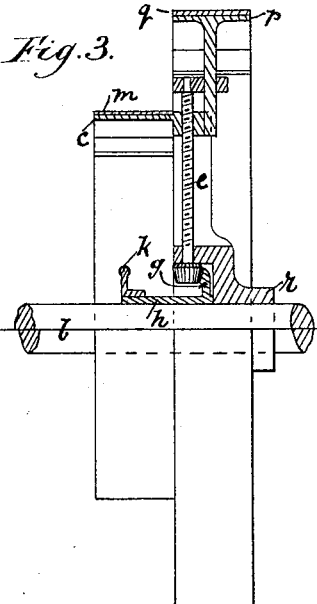
Figure 2:
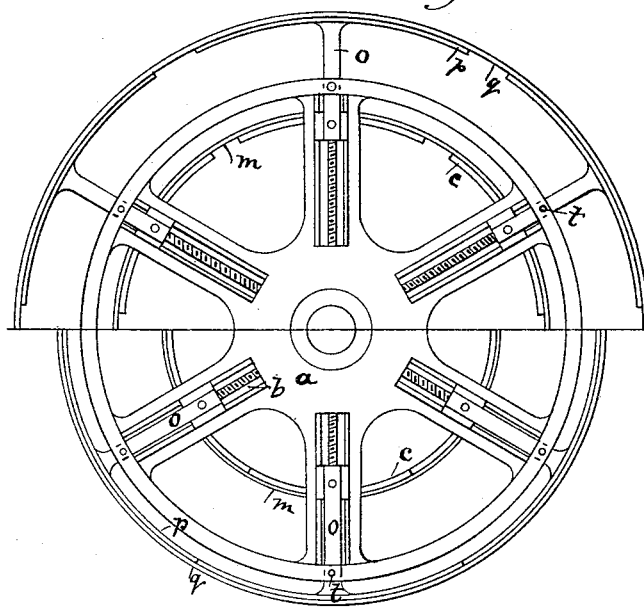
Figure 4:
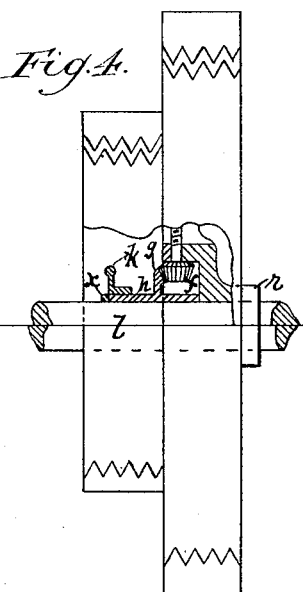

Figure 1 represents a front view of the pulley, part expanded and part contracted to its smallest dimensions. Fig. 2 shows back view of same; and Figs. 3 and 4 are side views, partly in section, of the pulley.

Similar letters refer to similar parts throughout the several views.

*a* represents a face-plate similar to that of a lathe provided with as many slots *b* as there are segments *c* in the rim. Working in these slots *b* are blocks *d*, fitted with screws *e*, (said blocks *d* forming nuts for the same,) provided with bevel cog-wheels or pinions *f* at their inner or outer extremities, preferably the former. The bevel-pinions *f* gear with the bevel cog-wheel *g*, having attached to or cast with it a long boss or sleeve, *h*, to which is keyed the hand-wheel *k*. This boss or sleeve *h* is bored to fit the shaft *l* and turns easily upon it. On turning the hand-wheel *k* the bevel-wheel *g*, pinions *f*, and screws *e* are rotated also, thus causing the segments *c*, attached to the blocks *d*, to advance toward or recede from the center of the pulley simultaneously, according to the direction in which the hand-wheel *k* is turned, thus diminishing or increasing the diameter of the working-face of the pulley. To avoid cutting the belt with the edges of the segments, we prefer to cover the face of the pulley with an india-rubber ring, *m*, fastened by rivets or other suitable means to the center of each segment.

To increase the diameter of the pulley still further than what can be done by means of the segments *c*, we attach to the back of the blocks *d* other arms *o* and segments *p*, covered with india-rubber ring *q*, as hereinbefore stated. When the belt is running on the inner ring or when being used in confined situations, the arms *o* may be detached from the blocks *d* and the arms brought into the center and held by means of set-screws in the holes *t*, thus preventing the outer rim from being expanded when the inner rim is increased in diameter, and vice versa. The pulley is provided with a boss, *r*, with suitable keyway for attachment to the shafting. The screws *e* revolve in bearings at either end, those at the end nearest to the center being provided with caps *s*, to permit of their insertion. By means of the double rim the ratio of alteration of diameter is much greater than is attainable by any means at present in use, the spaces in existing pulleys between the segments becoming too wide to allow of the correct working of the belts when expanding to any great extent.

If preferred, instead of dividing the segments straight across the face we may make the edges serrated, as shown in Fig. 4, so as to form a better support for the india-rubber, which is removed in the above-named Fig. 4; also, the bevel-wheel *g* may be placed in the position shown in Fig. 4, and secured from moving out of gear with the pinions *f* by means of the collar *x*.

What we claim as our invention, and desire to secure by Letters Patent, is—

In an expanding driving-pulley, the combination of the plate *a*, segments *c* and *p*, blocks *d*, screws *e*, pinions *f*, wheel *g*, hand-wheel *k*, and india-rubber rings *m* and *q*, all substantially as and for the purposes set forth.

JUDAH LEVY YULY.
HERBERT WALTER ANDREWS.

Witnesses:
W. STOAKES,
W. F. COOMBER,
*Clerks to Messrs. Binsteed & Prior, Solicitors, Portsmouth.*